US008867553B2

(12) United States Patent
Eronen et al.

(10) Patent No.: US 8,867,553 B2
(45) Date of Patent: Oct. 21, 2014

(54) PERFORMING INTERACTIVE CONNECTIVITY CHECKS IN A MOBILITY ENVIRONMENT

(75) Inventors: Pasi Ismo Eronen, Helsinki (FI); Hannes Tschofenig, Espoo (FI)

(73) Assignee: Nokia Corporation, Espoo (FI)

( * ) Notice: Subject to any disclaimer, the term of this patent is extended or adjusted under 35 U.S.C. 154(b) by 831 days.

(21) Appl. No.: 12/664,498

(22) PCT Filed: Jun. 12, 2008

(86) PCT No.: PCT/EP2008/057416
§ 371 (c)(1),
(2), (4) Date: Apr. 14, 2010

(87) PCT Pub. No.: WO2008/152107
PCT Pub. Date: Dec. 18, 2008

(65) Prior Publication Data
US 2010/0205653 A1    Aug. 12, 2010

(30) Foreign Application Priority Data
Jun. 14, 2007   (EP) .................................... 07110315

(51) Int. Cl.
*H04L 12/28*       (2006.01)
(Continued)

(52) U.S. Cl.
CPC .... *H04L 29/12509* (2013.01); *H04L 29/12528* (2013.01); *H04L 61/2567* (2013.01);
(Continued)

(58) Field of Classification Search
CPC .................. H04L 29/12509; H04L 29/12528; H04L 61/2567; H04L 61/2575; H04L 29/06027; H04L 69/08; H04L 65/104; H04L 65/1006; H04L 65/1009; H04L 65/1026; H04L 65/103; H04L 65/1036; H04L 65/1043; H04L 12/18; H04L 12/4633; H04L 29/12292; H04L 29/12377; H04L 61/2069; H04L 65/607; H04L 65/4076; H04L 61/2517; H04L 63/08; H04L 63/164; H04L 12/4641; H04L 63/0272; H04L 65/1069; H04W 8/26; H04W 12/02; H04Q 3/0045; H04Q 11/0478; H04N 21/6402; H04N 21/6405; H04N 21/64322
USPC .......... 370/208–473; 726/3–15; 709/224–227
See application file for complete search history.

(56) References Cited

U.S. PATENT DOCUMENTS 6,477,143 B1 *   11/2002   Ginossar ....................... 370/230
6,963,582 B1 *   11/2005   Xu ................................ 370/466
(Continued)

FOREIGN PATENT DOCUMENTS

EP    1694034 A       8/2006
EP    2003858 A1 *   12/2008   .............. H04L 29/12

OTHER PUBLICATIONS

"International Search Report and The Written Opinion of the International Searching Authority", received in corresponding PCT Application No. PCT/EP2008/057416, Dated Dec. 18, 2008, 20 pages.

(Continued)

Primary Examiner — Venkatesh Haliyur
(74) Attorney, Agent, or Firm — Harrington & Smith

(57) ABSTRACT

A network element, method and computer program product is enabled to perform interactive connectivity checks in a mobility environment. Specifically, a network element comprises a discovery unit configured to identify a candidate defined as a combination of an internet protocol address and a port which the network element can use to communicate with a particular other network element. The network further comprises a mobile internet protocol signaling unit configured to submit a candidate identified by the discovery unit and to receive a candidate related to the other network element, and a simple traversal underneath network address translators protocol enabled unit configured to perform a connectivity check for a pair constituted by the submitted candidate and the received candidate by using the simple traversal underneath network address translators protocol.

13 Claims, 2 Drawing Sheets

(51) Int. Cl.
*H04W 12/00* (2009.01)
*G06F 15/173* (2006.01)
*H04L 29/12* (2006.01)
*H04W 8/26* (2009.01)
*H04W 76/00* (2009.01)
*H04W 80/04* (2009.01)

(52) U.S. Cl.
CPC ............ *H04L 61/2575* (2013.01); *H04W 8/26* (2013.01); *H04W 76/00* (2013.01); *H04W 80/04* (2013.01)
USPC ........... 370/401; 370/235; 370/238; 370/356; 726/3; 726/14; 726/15; 455/456.1; 455/457; 455/414.3; 455/466; 709/224; 709/227

(56) References Cited

U.S. PATENT DOCUMENTS

| | | | |
|---|---|---|---|
| 7,187,671 B2* | 3/2007 | Moyano et al. | 370/353 |
| 7,269,173 B2* | 9/2007 | Iyer et al. | 370/395.31 |
| 7,298,702 B1* | 11/2007 | Jones et al. | 370/235 |
| 7,453,850 B2* | 11/2008 | Yang et al. | 370/331 |
| 7,499,401 B2* | 3/2009 | Buddhikot et al. | 370/235 |
| 7,546,125 B2* | 6/2009 | Sharma et al. | 455/436 |
| 7,562,393 B2* | 7/2009 | Buddhikot et al. | 726/26 |
| 7,688,820 B2* | 3/2010 | Forte et al. | 370/389 |
| 7,706,401 B2* | 4/2010 | Bae et al. | 370/466 |
| 7,916,682 B2* | 3/2011 | Nagarajan et al. | 370/321 |
| 7,920,549 B2* | 4/2011 | Alt et al. | 370/352 |
| 7,965,737 B2* | 6/2011 | Roy et al. | 370/466 |
| 7,983,254 B2* | 7/2011 | Alt et al. | 370/389 |
| 8,046,829 B2* | 10/2011 | Oba | 726/14 |
| 8,184,641 B2* | 5/2012 | Alt et al. | 370/395.54 |
| 8,224,985 B2* | 7/2012 | Takeda | 709/237 |
| 8,364,130 B2* | 1/2013 | Moliner et al. | 455/414.3 |
| 8,571,011 B2* | 10/2013 | Alt et al. | 370/352 |
| 2002/0191596 A1* | 12/2002 | Moyano et al. | 370/352 |
| 2003/0101281 A1* | 5/2003 | Andrews et al. | 709/245 |
| 2004/0203749 A1* | 10/2004 | Iyer et al. | 455/432.1 |
| 2005/0201304 A1* | 9/2005 | Olshansky | 370/282 |
| 2006/0034256 A1* | 2/2006 | Addagatla et al. | 370/352 |
| 2006/0075127 A1 | 4/2006 | Juncker et al. | |
| 2006/0209794 A1* | 9/2006 | Bae et al. | 370/352 |
| 2007/0019545 A1* | 1/2007 | Alt et al. | 370/230 |
| 2007/0019622 A1* | 1/2007 | Alt et al. | 370/352 |
| 2007/0019623 A1* | 1/2007 | Alt et al. | 370/352 |
| 2007/0022289 A1* | 1/2007 | Alt et al. | 713/168 |
| 2007/0036143 A1* | 2/2007 | Alt et al. | 370/352 |
| 2007/0078986 A1* | 4/2007 | Ethier et al. | 709/227 |
| 2007/0091848 A1* | 4/2007 | Karia et al. | 370/331 |
| 2007/0091907 A1* | 4/2007 | Seshadri et al. | 370/401 |
| 2007/0094374 A1* | 4/2007 | Karia et al. | 709/223 |
| 2007/0121580 A1* | 5/2007 | Forte et al. | 370/351 |
| 2007/0121596 A1* | 5/2007 | Kurapati et al. | 370/356 |
| 2007/0207804 A1* | 9/2007 | Sharma et al. | 455/436 |
| 2007/0264989 A1* | 11/2007 | Palakkal et al. | 455/416 |
| 2008/0013474 A1* | 1/2008 | Nagarajan et al. | 370/321 |
| 2008/0119165 A1* | 5/2008 | Mittal et al. | 455/411 |
| 2009/0222869 A1* | 9/2009 | Roy et al. | 725/109 |
| 2010/0205653 A1* | 8/2010 | Eronen et al. | 726/3 |
| 2011/0249617 A1* | 10/2011 | Desorbay et al. | 370/328 |
| 2011/0281567 A1* | 11/2011 | Moliner et al. | 455/414.3 |
| 2013/0185440 A1* | 7/2013 | Blau et al. | 709/227 |

OTHER PUBLICATIONS

Rosenberg Dynamicsoft J: Interactive Connectivity Establishment (ICE): A Methodology for Network Address Translator (NAT) Traversal for the Session Initiation Protocol (SIP); IETF Standard-Working-Draft, Internet Engineering Task Force, IETF, CH, Apr. 2, 2003, XP015005077.

Rosenberg, Cisco Systems, Huitema, C., Microsoft, Mahy, R., Plantronics, Wing, D., Cisco Systems J: "Simple Traversal Underneath Network Address Translators (NAT) (STUN)" IETF Standard-Working-Draft, Internet Engineering Task Force, IETF, CH, vol. behave, No. 4, Jul. 11, 2006, XP015046641, 62 pages.

Iyer, Prakash, Warrier, Ulhas: "InternetGatewayDevice:1"; Device Template Version 1.01, for UPnP v. 1.0; Standardized DCP; Nov. 12, 2001, 15 pages.

Le, F., Cmu, Faccin, S., Patil, B., Nokia, Tschofenig, H., Siemens: "Mobile IPv6 and Firewalls: Problem Statement"; RFC 4487, May 2006, 16 pages.

Stiemerling, M., Quittek, J., Nec, Taylor, T., NORTEL: "Middlebox Communications (MIDCOM) Protocol Semantics", RFC 3989, Feb. 2005, 70 pages.

Stiemerling, M., Quittek, J., Nec, Cadar, C: "Nec's Simple Middlebox Configuration (SIMCO) Protocol Version 3.0"; RFC 4540, May 2006, 67 pages.

Stiemerling, M., Nec, Tschofenig, H., Siemens, Aoun, C., Davies, E., Folly Consulting: "NAT/Firewall NSIS Signaling Layer Protocol (NSLP)", IETF Standard-Working-Draft, NSIS Working Group, Sep. 6, 2007, 100 pages.

Arkko, J., Ericsson, van Beijnum, I.: "Failure Detection and Locator Pair Exploration Protocol for IPv6 Multihoming", IETF Standard-Working-Draft, Network Working Group, Jun. 16, 2007, 41 pages.

Office Action received in corresponding European Application No. 07110315.4, Dated Jan. 24, 2012, 5 pages.

Rosenberb Cisco J, "Interactive Connectivity Establishment (ICE): A Protocol for Network Address Translator (NAT) Traversal for Offer/Answer Protocols; draft-ietf-mmusic-ice-16.txt", Jun. 12, 2007, vol. mmusic, No. 16, Jun. 12, 2007, XP015051451, ISN: 0000-0004.

Rosenberg, J., et al.; "Obtaining Relay Addresses from Simple Traversal Underneath NAT (STUN), draft-ietf-behave-turn-03"; Mar. 4, 2007; whole document (44 pages).

Rosenberg, J.; "Interactive Connectivity Establishment (ICE): A Methodology for Network Address Translator (NAT) Traversal for the Session Initiation Protocol (SIP); draft-rosenberg-sipping-ice-00"; Feb. 24, 2003; whole document (36 pages); dynamicsoft, Internet-Draft.

Rosenberg, J.; "Interactive Connectivity Establishment (ICE): A Methodology for Network Address Translator (NAT) Traversal for Offer/Answer Protocols; draft-ietf-mmusic-ice-15"; Mar. 26, 2007; whole document (103 pages).

\* cited by examiner

PERFORMING INTERACTIVE CONNECTIVITY CHECKS IN A MOBILITY ENVIRONMENT

RELATED APPLICATION

This application was originally filed as PCT Application No. PCT/EP/2008/057416 filed Jun. 12, 2008, which claims priority to EP Application No. 07110315.4 filed Jun. 14, 2007.

TECHNICAL FIELD

The present invention relates to a network element, a method and a computer program product which are enabled to perform interactive connectivity checks in a mobility environment. In particular, the present invention is related to Mobile IP in the presence of network address translators (NATs) and stateful packet filtering firewalls.

BACKGROUND

The traversal of network address translators (NAT) and firewalls for Mobile IP (internet protocol) focuses only on the communication between the mobile node and the home agent. End points should, however, be able to communicate directly to avoid traffic being routed always through the home agent.

Currently, there are no mechanisms in Mobile IP that allow an end point to determine systematically possible communication paths between two end points and to fall back to reverse tunneling via the home agent only in the worst case.

Stateful packet filtering firewalls behave in a similar way as NATs with the notable difference that they do not change any IP address or port information. Still, they create state based on outbound packets that is later matched against inbound packets. In the following, reference is mainly made to NATs. However, the statements equally apply to stateful packet-filtering firewalls.

Three types of problems occur when NATs and firewalls are located between the mobile node and the correspondent node. Firstly, communication might not be possible along these paths, whereby failures occur without a chance for the end points to determine where the source of the problem is and to have means to fix it. Secondly, there is no systematic way to determine which paths are available and which ones should be selected to exchange data traffic. Finally, data traffic has to travel via the home agent and therefore communication is more costly in terms of latency and cost. An outlook of a few problems is provided in a document by F. Le, et al., "Mobile IPv6 and Firewalls: Problem Statement", RFC 4487, May 2006, by the Internet Engineering Task Force (IETF).

Some approaches of the prior art to deal with one or more of the above problems are as follows. It is possible to route all traffic via the home agent (reverse tunneling). This option introduces costs and latencies, as previously mentioned. Further, it may be possible to configure firewalls so that they allow all Mobile IP traffic. This is a difficult deployment practice. It does not work for NATs. In addition, the end points could use some kind of "middlebox signaling protocol", such as disclosed by M. Stiemerling et al.: "NAT/Firewall NSIS Signaling Layer Protocol (NSLP)", work in progress, IETF Internet-Draft draft-ietf-nsis-nslp-natfw-14, March 2007; UPnP Forum, "Internet Gateway Device (IGD) Standardized Device Control Protocol V 1.0", November 2001; M. Stiemerling, J. Quittek, C. Cadar, "NEC's Simple Middlebox Configuration (SIMCO) Protocol Version 3.0", RFC 4540, May 2006; and M. Stiemerling, J. Quittek, T. Taylor, "Middlebox Communications (MIDCOM) Protocol Semantics", RFC 3989, February 2005, to talk to the NAT and firewall to allow subsequent data traffic to bypass. While some of these protocols work only in local networks, such as the approach with internet gateway device, others work with central controllers, such as "MIDCOM" or "SIMCO", while the NSIS work seems to be the most promising candidate that would technically provide some of the required functionality. However, neither the NSIS work nor MIDCOM/SIMCO enjoys deployment, and there is currently no indication that this deployment will happen any time soon. Finally, a protocol for end-to-end connectivity checks has been defined in the IETF SHIM6 working group, called REAP (J. Arkko, I. van Beijnum, "Failure Detection and Locator Pair Exploration Protocol for IPv6 Multihoming", (work in progress), draft-ietf-shim6-failure-detection-07, December 2006). It only works on IPv6 (internet protocol version 6) and it only tests source and destination address pairs, not flows.

SUMMARY

Thus, it is an object of the present invention to improve the prior art and to avoid the shortcomings described above.

According to a first aspect of the present invention, this is accomplished by a network element, comprising a discovery unit configured to identify a candidate defined as a combination of an internet protocol address and a port which the network element can use to communicate with a particular other network element; a mobile internet protocol signaling unit configured to submit a candidate identified by the discovery unit and to receive a candidate related to the other network element; and a simple traversal underneath network address translators protocol enabled unit configured to perform a connectivity check for a pair constituted by the submitted candidate and the received candidate by using the simple traversal underneath network address translators protocol.

Advantageous modifications of the first aspect may be as follows.

The network element may further comprise an interactive connectivity establishment protocol enabled unit configured to determine a candidate pair for usage with data traffic among a plurality of candidate pairs that passed the connectivity check.

The mobile internet protocol signaling unit may be further configured to establish keying material, and the simple traversal underneath network address translators protocol enabled unit is further configured to compute a message authentication code for covering a connectivity check.

The mobile internet protocol signaling unit may be further configured to create extensions in mobile internet protocol signaling for submitting a candidate.

The simple traversal underneath network address translators protocol enabled unit may be further configured to perform a connectivity check by using the internet protocol address and the port corresponding to the submitted candidate.

According to a second aspect of the present invention, the above is accomplished by a communication method, comprising identifying a candidate defined as a combination of an internet protocol address and a port which a network element can use to communicate with a particular other network element; submitting the candidate by using mobile internet protocol signaling; receiving a candidate related to the other network element by using mobile internet protocol signaling; performing a connectivity check for a pair constituted by the submitted candidate and the received candidate by using simple traversal underneath network address translators protocol.

Advantageous modifications of the second aspect may be as follows.

The communication method may further comprise determining a candidate pair for usage with data traffic among a plurality of candidate pairs that passed the connectivity check by using interactive connectivity establishment protocol.

Submitting the candidate by using mobile internet protocol signaling may further comprise establishing keying material, computing a message authentication code, and covering the connectivity check with the message authentication code.

Submitting the candidate by using mobile internet protocol signaling may further comprise creating extensions in mobile internet protocol signaling.

The connectivity check may be performed by using the internet protocol address and the port corresponding to the submitted candidate.

According to a third aspect of the present invention, the above is accomplished by a computer program product embodied on a computer-readable medium, wherein the computer program product is configured to provide instructions to carry out a method according to the second aspect of the present invention or any of its modifications.

According to a fourth aspect of the present invention, the above is accomplished by a network element, comprising means for identifying a candidate defined as a combination of an internet protocol address and a port which the network element can use to communicate with a particular other network element; means for submitting a candidate identified by the discovery unit and for receiving a candidate related to the other network element by using a mobile internet protocol; and means for performing a connectivity check for a pair constituted by the submitted candidate and the received candidate by using the simple traversal underneath network address translators protocol.

Thus, according to embodiments of the present invention, it is tested whether data traffic can be exchanged between two end points, e.g. a mobile node and a corresponding node.

Specifically, embodiments of the present invention comprise the following features: Extensions in Mobile IP signaling allow IP address and port candidates that have been obtained locally at the end point to be exchanged via mobility signaling end-to-end. These candidates might be obtained locally via the different interfaces, might reflect the path between the home agent (reverse tunneling), etc. Once both end points are aware of each others candidates they perform connectivity checks using the STUN protocol. Alternatively, a STUN-alike protocol built into Mobile IP could be used. However, the usage of STUN is presently preferred due to its maturity. For security, the STUN protocol keying material previously established with the end-to-end mobility signaling is used. As soon as the candidate pairs that provide end-to-end connectivity have been determined, the ICE algorithm (interactive connectivity establishment algorithm as defined by J. Rosenberg, "Interactive Connectivity Establishment (ICE): A Methodology for Network Address Translator (NAT) Traversal for Offer/Answer Protocols", (work in progress), draft-ietf-mmusic-ice-15, March 2007) determines the best candidates for usage with data traffic that is UDP (user datagram protocol) encapsulated when traversing NATs and stateful packet filtering firewalls.

STUN (as defined by Rosenberg, J., "Simple Traversal Underneath Network Address Translators (NAT) (STUN)", draft-ietf-behave-rfc3489bis-05 (work in progress), October 2006), which is the core building block of ICE, enjoys widespread deployment. TURN (as defined by Jonathan Rosenberg et al.: "Obtaining Relay Addresses from Simple Traversal Underneath NAT (STUN)", work in progress, IETF Internet-Draft draft-ietf-behave-turn-03, March 2007), which is also used by the ICE framework, may be used but could be replaced by reverse tunneling functionality.

Embodiments of the present invention assume that Mobile IP signaling allows end-to-end signaling to communicate the candidates and enables subsequent STUN signaling to be protected. While this is true for Mobile IP, extensions for Mobile IPv6 are required and not all deployment variations of Mobile IP are supported.

According to embodiments of the present invention, it is made possible that the different building blocks as developed in the IETF, for example Dual Stack Mobile IPv4, Dual Stack Mobile IPv6, route optimization, MIP reverse tunneling, MIP triangular routing, multiple HAs, multiple care-of addresses/multi-homing, etc. can be glued together to enable a more robust end-to-end communication.

In addition, embodiments of the present invention reuse STUN and ICE work developed by the Voice over IP community and applies it to lower layer protocols.

BRIEF DESCRIPTION OF THE DRAWINGS

Other objects, features, advantages and details will become more readily apparent from the following detailed description of embodiments of the present invention which is to be taken in conjunction with the appended drawings, in which.

DETAILED DESCRIPTION

In the following, embodiments of the present invention are described by referring to particular implementation details. It is however to be understood that the present invention is not intended to be limited to these implementation details.

In a typical deployment of ICE usage with Mobile IP (hereinafter abbreviated as M-ICE), in accordance with the functionality as specified by ICE, there are two endpoints, a mobile node and correspondent nodes, which want to communicate. They are able to communicate indirectly via a combination of Mobile IP signaling and reverse tunneling. It is to be noted here, that M-ICE is also intended for firewall traversal of Mobile IP.

At the beginning of the M-ICE process, the end points are ignorant of their own topologies. They might or might not be behind a NAT (or multiple tiers of NATs) and might be behind firewalls that limit the ability to communicate in different ways between the end points. M-ICE allows these end points to discover enough information about their topologies to potentially find one or more paths by which they can communicate.

In a typical environment for M-ICE deployment, the two end points may be labeled L and R for left and right. Both L and R are behind their own respective NATs or firewalls though they may not be aware of it. The type of NAT or firewall and their properties are also unknown. L and R are capable of engaging in an end-to-end mobility protocol exchange. This exchange will occur through mobility anchor points, such as home agents.

The ICE functionality of TURN servers is provided by the home agent via reverse tunneling. From a deployment point of view it is simpler to co-locate a STUN server with the home agent, since this is convenient from a security and configuration point of view, even though it is, from a solution point of view, not necessary.

The basic idea behind M-ICE is as follows: Each end point has a variety of candidate ADDRESSES (IP addresses only) and TRANSPORT ADDRESSES (combination of IP address and port) it could use to communicate with the other end point.

The paths will be different depending on the chosen ADDRESSES, TRANSPORT ADDRESSES and routing modes. Potentially, any of L's candidate transport addresses can be used to communicate with any of R's candidate transport addresses. In practice, however, many combinations do not work. For instance, if L and R are both behind NATs, their directly attached interface addresses are unlikely to be able to communicate. The purpose of M-ICE is to discover which pairs of addresses will work. The way that M-ICE does this is to systematically try all possible pairs (in a carefully sorted order) until it finds one or more that works.

Figure 1:
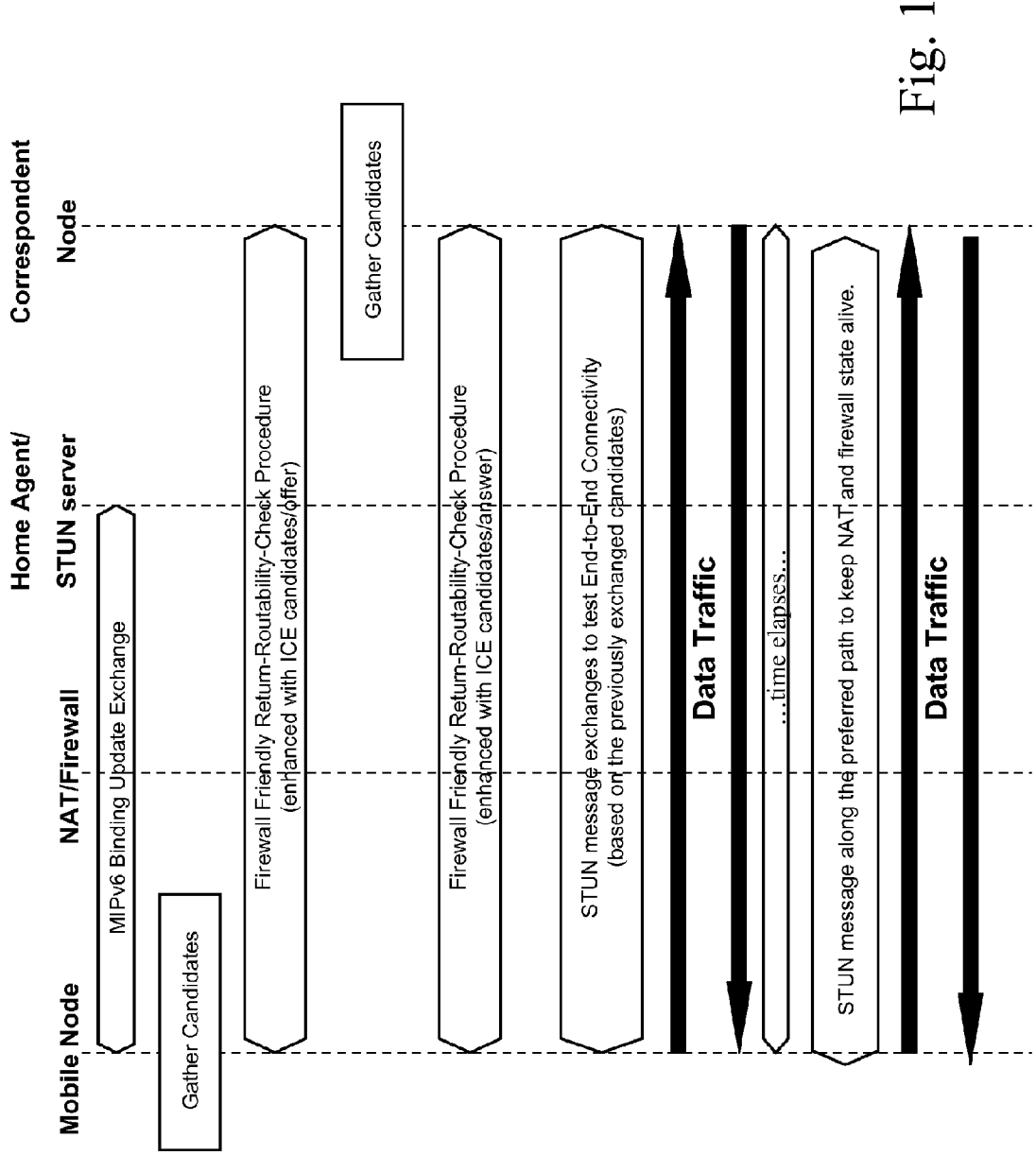
FIG. 1 shows a signaling diagram depicting an embodiment of the present invention.
Figure 2:
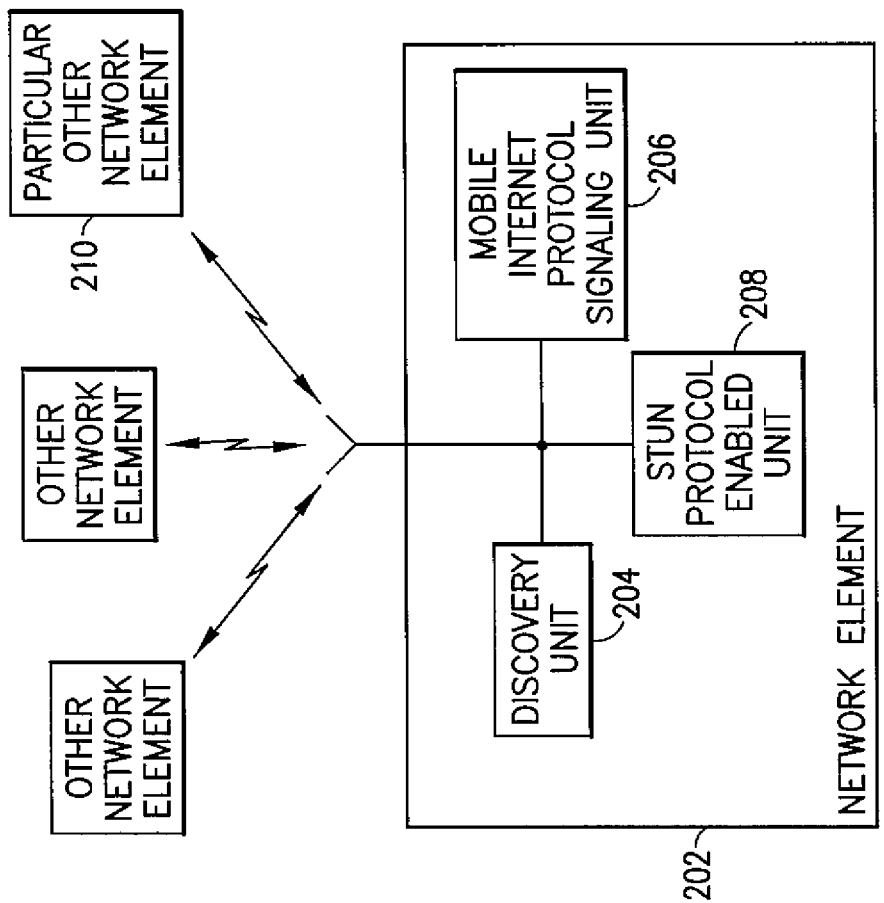
FIG. 2 shows a network element and apparatus according to an embodiment.

In accordance with embodiments of the present invention, below is described an implementation example of the network element and method according to the present invention, which is shown in FIG. 1.

In order to execute ICE, an agent has to identify all of its address candidates. A CANDIDATE is a transport address, i.e. a combination of IP address and port for a particular transport protocol.

According to embodiments of the present invention, there are three types of candidates for usage with the ICE algorithms:

(1) One viable candidate is a transport address obtained directly from a local interface. Such a candidate is called a HOST CANDIDATE.

(2) Translated addresses on the public side of a NAT (called SERVER REFLEXIVE CANDIDATES). This address is obtained via STUN.

(3) Addresses obtained via relaying traffic through the home agent, called RELAYED CANDIDATES.

Once L has gathered all of its candidates, it orders them from highest to lowest priority and sends them to R over the signaling channel. The extensions to support candidates to be exchanged in Mobile IP may have to be standardized.

When R receives the offer, it performs the same gathering procedure and responds with its own list of candidates. At the end of this procedure, each agent has a complete list of both its candidates and its peer's candidates. It pairs them up, resulting in CANDIDATE PAIRS.

To see which pairs work, the agent schedules a series of CHECKS. Each check is a STUN transaction that the client will perform on a particular candidate pair by sending a STUN request from the local candidate to the remote candidate.

It is important to note that the STUN requests are sent to and from the exact same IP addresses and ports that will be used for subsequent data traffic. In the Mobile IP environment, in the worst case UDP encapsulation is used. With NATs along the communication path between the sender and receiver this is a common practice.

If a working pair exists the algorithm reused from ICE will eventually find it no matter what order the candidates are tried in. In order to produce faster (and better) results, the candidates are sorted in a specified order. The resulting list of sorted candidate pairs is called the CHECK LIST.

Because M-ICE is used to discover which addresses can be used to send traffic between two end points, it is important to ensure that the process is not impacted by an adversary. Each STUN connectivity check is covered by a message authentication code (MAC) computed using a key established as part of the signaling channel, i.e., keying material established as part of Mobile IP signaling. This MAC provides message integrity and data origin authentication, thus stopping an attacker from forging or modifying connectivity check messages.

M-ICE checks are performed in a specific sequence, so that candidate pairs with high priority are checked first, followed by lower priority ones.

Embodiments of the present invention achieve the following advantages. It is made possible for end points to determine whether there is a working path between the two end points to exchange data traffic. Further, it is not required to modify NATs or firewalls. In addition, these embodiments are built on the ICE/STUN approach that enjoys deployment.

An implementation of embodiments of the present invention may be achieved by providing a computer program product embodied as a computer readable medium which stores instructions according to the above described embodiments.

Thus, what is described above is a network element, method and computer program product enabling to perform interactive connectivity checks in a mobility environment. Specifically, a network element 202 comprises a discovery unit 204 configured to identify a candidate defined as a combination of an Internet protocol address and a port which the network element can use to communicate with a particular other network element 210; a mobile internet protocol signaling unit 206 configured to submit a candidate identified by the discovery unit and to receive a candidate related to the other network element; and a simple traversal underneath network address translators protocol enabled unit 208 configured to perform a connectivity check for a pair constituted by the submitted candidate and the received candidate by using the simple traversal underneath network address translators protocol.

What has been described above is what is presently considered to be preferred embodiments of the present invention. However, as is apparent to the skilled reader, these are provided for illustrative purposes only and are in no way intended to that the present invention is restricted thereto. Rather, it is the intention that all variations and modifications be included which fall within the spirit and scope of the appended claims.

The invention claimed is:

1. A network element, comprising:
   a discovery unit configured to enable the network element to identify a candidate defined as a combination of an internet protocol address and a port which the network element can use to communicate with a particular other network element;
   a mobile internet protocol signaling unit configured to enable the network element to submit a candidate identified by the discovery unit and to receive a candidate related to the other network element and to establish keying material; and
   a simple traversal underneath network address translators protocol enabled unit configured to enable the network element to perform a connectivity check for a pair constituted by the submitted candidate and the received candidate by using the simple traversal underneath network address translators protocol and to cover the connectivity check by computing a message authentication code.

2. The network element according to claim 1, further comprising:
   an interactive connectivity establishment protocol enabled unit configured to enable the network element to determine a candidate pair for usage with data traffic among a plurality of candidate pairs that passed the connectivity check.

3. The network element according to claim 1, wherein the mobile internet protocol signaling unit is further configured to enable the network element to create extensions in mobile internet protocol signaling for submitting a candidate.

4. The network element according to claim 1, wherein the simple traversal underneath network address translators protocol enabled unit is further configured to enable the network element to perform a connectivity check by using the internet protocol address and the port corresponding to the submitted candidate.

5. A method, comprising:
identifying, by a network element in a communication network, a candidate defined as a combination of an internet protocol address and a port which a network element can use to communicate with a particular other network element;
submitting, by the network element in the communication network, the candidate by using mobile internet protocol signaling which comprises establishing keying material, computing a message authentication code, and covering the connectivity check with the message authentication code;
receiving, by the network element in the communication network, a candidate related to the other network element by using mobile internet protocol signaling;
performing, by the network element in the communication network, a connectivity check for a pair constituted by the submitted candidate and the received candidate by using simple traversal underneath network address translators protocol.

6. The method according to claim 5, further comprising:
determining, by the network element in the communication network, a candidate pair for usage with data traffic among a plurality of candidate pairs that passed the connectivity check by using interactive connectivity establishment protocol.

7. The method according to claim 5, wherein submitting the candidate, by the network element in the communication network, by using mobile internet protocol signaling further comprises creating extensions in mobile internet protocol signaling.

8. The method according claim 5, wherein performing, by the network element in the communication network, a connectivity check further comprises using the internet protocol address and the port corresponding to the submitted candidate.

9. A computer program product embodied on a non-transitory computer-readable medium, the computer program product configured to provide instructions to carry out a method according to claim 5.

10. An apparatus, comprising a network element, comprising:
one or more controllers; and
one or more non-transitory computer readable media including computer program code, the one or more non-transitory computer readable media and the computer program code configured, with the one or more controllers, to cause the apparatus to perform at least the following:
identifying, by the network element, a candidate defined as a combination of an internet protocol address and a port which the network element can use to communicate with a particular other network element;
submitting, by the network element, the candidate by using mobile internet protocol signaling which comprises establishing keying material, computing a message authentication code, and covering the connectivity check with the message authentication code;
receiving, by the network element, a candidate related to the other network element by using mobile internet protocol signaling; and
performing, by the network element, a connectivity check for a pair constituted by the submitted candidate and the received candidate by using simple traversal underneath network address translators protocol.

11. The apparatus according to claim 10, wherein the one or more non-transitory computer readable media and the computer program code are further configured, with the one or more controllers, to cause the apparatus to perform:
determining, by the network element, a candidate pair for usage with data traffic among a plurality of candidate pairs that passed the connectivity check by using interactive connectivity establishment protocol.

12. The apparatus according to claim 10, wherein submitting the candidate, by the network element, by using mobile internet protocol signaling further comprises creating extensions in mobile internet protocol signaling.

13. The apparatus according claim 10, wherein performing, by the network element, the connectivity check further comprises using the internet protocol address and the port corresponding to the submitted candidate.

* * * * *